US012750836B2

(12) United States Patent
Matsumura et al.

(10) Patent No.: US 12,750,836 B2
(45) Date of Patent: Sep. 29, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 375 days.

(21) Appl. No.: 17/911,011

(22) PCT Filed: Mar. 13, 2020

(86) PCT No.: PCT/JP2020/011156
§ 371 (c)(1),
(2) Date: Sep. 12, 2022

(87) PCT Pub. No.: WO2021/181667
PCT Pub. Date: Sep. 16, 2021

(65) Prior Publication Data

US 2023/0098912 A1 Mar. 30, 2023

(51) Int. Cl.

| | |
|---|---|
| ***H04W 72/00*** | (2023.01) |
| ***H04L 1/1829*** | (2023.01) |
| ***H04W 72/044*** | (2023.01) |
| ***H04W 72/1268*** | (2023.01) |
| ***H04W 72/21*** | (2023.01) |

(52) U.S. Cl.
CPC ......... *H04W 72/046* (2013.01); *H04L 1/1854* (2013.01); *H04W 72/1268* (2013.01); *H04W 72/21* (2023.01)

(58) Field of Classification Search
CPC ........... H04W 72/1268; H04W 72/046; H04W 72/21; H04L 1/1854; H04L 1/1858; H04L 1/1864; H04B 7/024; H04B 7/06968; H04B 7/0695
See application file for complete search history.

(56) References Cited

U.S. PATENT DOCUMENTS

2019/0319823 A1* 10/2019 Akkarakaran ........ H04L 5/0053
2021/0144720 A1* 5/2021 Xu ........................ H04L 5/0053
2021/0184812 A1* 6/2021 MolavianJazi ....... H04L 1/0041
(Continued)

FOREIGN PATENT DOCUMENTS

WO 2019244221 A1 12/2019

OTHER PUBLICATIONS

ZTE (ZTE Enhancements on multi-beam operation. 3GPP TSG RAN WGI #99 RI-1911931, Nov. 22, 2019).*
(Continued)

*Primary Examiner* — Lakeram Jangbahadur
(74) *Attorney, Agent, or Firm* — Osha Bergman Watanabe & Burton LLP

(57) ABSTRACT

A terminal according to an aspect of the present disclosure includes: a control section that determines one or more default spatial relations to be applied to transmission occasions of repetition transmission of a physical uplink control channel (PUCCH); and a transmitting section that performs the repetition transmission by using a spatial domain transmission filter based on the one or more default spatial relations. According to an aspect of the present disclosure, repetition UL transmission can be appropriately controlled.

4 Claims, 12 Drawing Sheets

(56) References Cited

U.S. PATENT DOCUMENTS

| | | | | |
|---|---|---|---|---|
| 2021/0259004 | A1* | 8/2021 | Takeda | H04L 1/08 |
| 2023/0093264 | A1* | 3/2023 | Gao | H04W 52/16 370/329 |
| 2023/0126574 | A1* | 4/2023 | Ji | H04W 72/046 370/329 |

OTHER PUBLICATIONS

LG (LG Electronics, Feature lead summary of Enhancements on Multi-beam Operations RI-1912277, Nov. 22, 2019).*
Office Action issued in Chinese Application No. 202080100821.6, dated Jun. 24, 2024 (12 pages).
Extended European Search Report issued in the European Application No. 20923727.0, mailed Nov. 7, 2023 (9 pages).
International Search Report issued in PCT/JP2020/011156 on Oct. 20, 2020 (2 pages).
Written Opinion of the International Searching Authority issued in PCT/JP2020/011156 on Oct. 20, 2020 (3 pages).
ZTE; "Enhancements on multi-beam operation"; 3GPP TSG RAN WG1 Meeting #99, R1-1911931; Reno, US; Nov. 18-22, 2019 (20 pages).
LG Electronics; "Feature lead summary of Enhancements on Multi-beam Operations"; 3GPP TSG RAN WG1 Meeting #99, R1-1912277; Reno, USA; Nov. 18-22, 2019 (34 pages).
Lenovo, Motorola Mobility; "Discussion of multi-beam operation"; 3GPP TSG RAN WG1 Meeting #99, R1-1912317; Reno, USA; Nov. 18-22, 2019 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| Index | TCI STATE ID |
|---|---|
| 1 | #0 |
| 2 | #1 |
| 3 | #2 |
| 4 | #3 |

FIG. 3

| Ordering index | BEAM ID |
|---|---|
| 1 | #1 |
| 2 | #2 |
| 3 | #3 |
| 4 | #4 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In the universal mobile telecommunications system (UMTS) network, the specifications of long term evolution (LTE) have been drafted for the purpose of further increasing high speed data rates, providing lower delays, and so on (see Non Patent Literature 1). In addition, the specifications of LTE-Advanced (third generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), 6th generation mobile communication system (6G), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In 3GPP Rel. 15, repetition transmission is supported in a UL data channel (for example, a physical uplink shared channel (PUSCH)). The UE performs control to transmit the PUSCH over a plurality of slots (for example, K consecutive slots) based on repetition factor K configured from the network (for example, a base station). That is, when the repetition transmission is performed, each PUSCH is transmitted in a different slot (for example, in units of slots).

On the other hand, in Rel. 16 and subsequent releases, when PUSCH performs repetition transmission, it is considered to perform a plurality of PUSCH transmission within one slot. That is, each PUSCH is transmitted in units shorter than slots (for example, in units of sub slots and in units of mini slots).

Furthermore, in the NR, communication using one or a plurality of transmission/reception points (TRP) (multi-TRPs) has been studied.

However, in the NR specifications so far, how to control repeated UL transmission of a UE when multi-panels/TRPs are used has not been sufficiently studied. For example, the spatial relation that the UE applies to repetition transmission is not clear. If repetition transmission for the multi-TRPs is not appropriately performed, a reduction in throughput or a degradation in communication quality may be caused.

Thus, an object of the present disclosure is to provide a terminal, a radio communication method, and a base station that can control appropriately repetition UL transmission.

Solution to Problem

A terminal according to an aspect of the present disclosure includes: a control section that determines one or more default spatial relations to be applied to transmission occasions of repetition transmission of a physical uplink control channel (PUCCH); and a transmitting section that performs the repetition transmission by using a spatial domain transmission filter based on the one or more default spatial relations.

Advantageous Effects of Invention

According to an aspect of the present disclosure, repetition UL transmission can be appropriately controlled.

BRIEF DESCRIPTION OF DRAWINGS

FIG. 3 is a diagram illustrating an example of the order of spatial relation IDs according to Embodiment 1.2.2.

DESCRIPTION OF EMBODIMENTS (Repetition Transmission)

Figure 1:
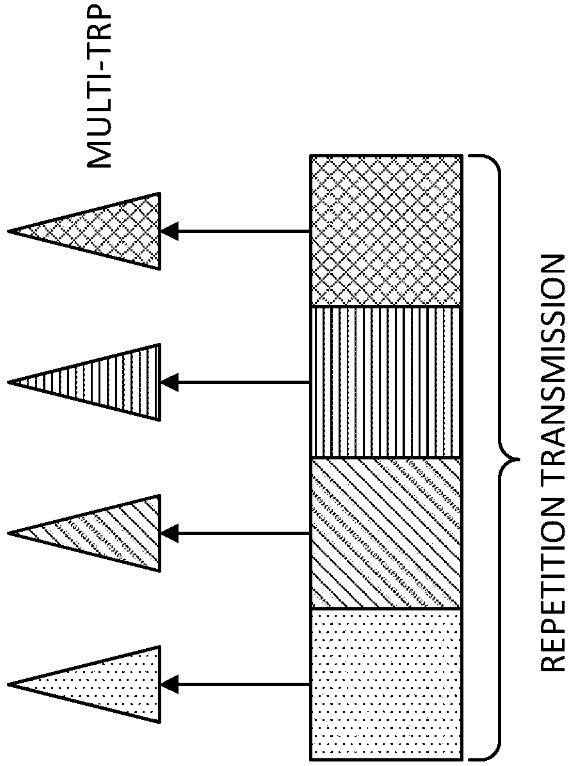
FIG. 1 is a diagram illustrating an example of repetition transmission of PUSCH in multi-TRPs.

In Rel. 15, repetition transmission is supported in data transmission. For example, a base station (network (NW), gNB) may repeatedly transmit DL data (for example, downlink shared channel (PDSCH)) for a given number of times. Alternatively, a UE may repeat UL data (for example, uplink shared channel (PUSCH)) for a given number of times.

The UE may be scheduled for a given number of repeated PUSCH transmissions by a single DCI. The number of repetitions is also referred to as a repetition factor K or an aggregation factor K.

Further, an n-th repetition is also called an n-th transmission occasion, and the like, and may be identified by a repetition index k ($0 \le k \le K-1$). Repetition transmission may be applied to a PUSCH dynamically scheduled by DCI (for example, a dynamic grant-based PUSCH), or may be applied to a configured grant-based PUSCH.

The UE semi-statically receives information indicating the repetition factor K (for example, aggregationFactorUL or aggregationFactorDL) by higher layer signaling. Here, the higher layer signaling may be, for example, any of radio resource control (RRC) signaling, medium access control (MAC) signaling, broadcast information, and so on, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), or the like.

The UE controls PDSCH receiving processing (for example, at least one of receiving, demapping, demodulation, or decoding) or a PUSCH transmitting processing (for example, at least one of transmitting, mapping, modulation, or code) in the K consecutive slots on the basis of at least one of the following field values (or information indicated by the field value) in the above DCI:

- the allocation of time domain resource (such as the start symbol and the number of symbols in each slot, for example),
- the allocation of frequency domain resource (for example, a given number of resource blocks (RBs) or a given number of resource block groups (RBGs)),
- the modulation and coding scheme (MCS) index,
- the configuration of the demodulation reference signal (DMRS) of the PUSCH, or
- spatial relation information of PUSCH, or the state (TCI-state) of the transmission configuration indication or transmission configuration indicator (TCI).

The same symbol allocation may be applied between consecutive K slots. The UE may determine the symbol allocation in each slot based on the start symbol S and the number of symbols L (for example, start and length indicator (SLIV)) determined based on the value m of a given field (for example, a time domain resource allocation list (TDRA) field) in the DCI. Note that the UE may determine the first slot based on the K2 information determined based on the value m of a given field (for example, the TDRA field) of the DCI.

On the other hand, the redundancy versions (RVs) applied to the TBs based on the same data may be the same or at least partially different between the consecutive K slots. For example, the RV applied to the TB in the n-th slot (transmission occasion, repetition) may be determined based on the value of a given field (for example, the RV field) in the DCI.

In Rel. 15, a PUSCH may be repeatedly transmitted over a plurality of slots (in units of slots). In Rel. 16 and later, it is supported to repeatedly transmit a PUSCH in a unit shorter than a slot (for example, in units of subslots, in units of minislots, or in units of a given number of symbols).

The UE may determine the symbol allocation of PUSCH transmission (for example, PUSCH with k=0) in a given slot based on the start symbol S and the number of symbols L determined based on the value m of a given field (for example, the TDRA field) in the DCI of the PUSCH. Note that the UE may determine the given slot based on the Ks information determined based on the value m of the given field (for example, the TDRA field) of the DCI.

The UE may dynamically receive information indicating repetition factor K (for example, number of repetitions) using downlink control information. The repetition factor may be determined based on the value m in the given field (for example, TDRA field) in the DCI. For example, a table in which correspondence between the bit value notification of which is performed by the DCI and the repetition factor K, the start symbol S, and the number of symbols L is defined may be supported.

The slot-based repetition transmission may be referred to as a repetition transmission type A (for example, PUSCH repetition Type A), and the subslot-based repetition transmission may be referred to as a repetition transmission type B (for example, PUSCH repetition Type B).

The UE may be configured to apply at least one of a repetition transmission type A and a repetition transmission type B. For example, notification of the repetition transmission type applied by the UE may be performed from the base station to the UE using higher layer signaling (for example, PUSCHRepTypeIndicator).

Either one of the repetition transmission type A or the repetition transmission type B may be configured in the UE for each DCI format scheduling the PUSCH.

For example, for the first DCI format (for example, DCI format 0_1), if higher layer signaling (for example, PUSCHRepTypeIndicator-AorDCIFormat0_1) is configured to the repetition transmission type B (for example, PUSCH-RepTypeB), the UE applies the repetition transmission type B for the PUSCH repetition transmission scheduled in the first DCI format. Otherwise (for example, in a case where PUSCH-RepTypeB is not configured or in a case where PUSCH-RepTypA is configure), the UE applies repetition transmission type A for the PUSCH repetition transmission scheduled in the first DCI format.

(Spatial Relation for SRS and PUSCH)

In Rel. 15 NR, the UE may receive information (SRS configuration information, for example, a parameter in the RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be associated with a given number of SRS resources (given number of SRS resources may be grouped). Each SRS resource may be specified by an SRS resource identifier (SRS Resource Indicator (SRI)) or an SRS resource ID (Identifier).

The SRS resource set information may include information of an SRS resource set ID (SRS-ResourceSetId), a list of SRS resource IDs (SRS-ResourceId) used in the resource set, an SRS resource type (for example, one of periodic SRS, semi-persistent SRS, and aperiodic CSI (Aperiodic SRS)), and SRS usage.

Herein, the SRS resource type may indicate any one of a periodic SRS (P-SRS), a semi-persistent SRS (SP-SRS), and an aperiodic CSI (aperiodic SRS (A-SRS)). The UE may periodically (or periodically after activation) transmit the P-SRS and the SP-SRS, and transmit the A-SRS based on the SRS request of the DCI.

Further, the usage (the RRC parameter "usage" or the Layer-1 (L1) parameter "SRS-SetUse") may be, for example, beam management, codebook (CB), noncodebook (NCB), antenna switching, or the like. SRS used for the codebook or the non-codebook may be used to determine a precoder for codebook-based or non-codebook-based PUSCH transmission based on SRI.

For example, in the case of the codebook-based transmission, the UE may determine the precoder for the PUSCH transmission on the basis of the SRI, a Transmitted Rank Indicator (TRI), and a Transmitted Precoding Matrix Indicator (TPMI). The UE may determine the precoder for the PUSCH transmission based on the SRI, for the non-codebook-based transmission.

The SRS resource information may include an SRS resource ID (SRS-ResourceId), the number of SRS ports, an SRS port number, a transmission Comb, an SRS resource mapping (for example, time and/or frequency resource location, resource offset, cycle of resource, number of repetitions, number of SRS symbols, SRS bandwidth, etc.), hopping-related information, an SRS resource type, a sequence ID, spatial relation information of an SRS, and the like.

The spatial relation information (for example, "spatialRelationInfo" of the RRC information element) of the SRS may indicate spatial relation information between a given reference signal and the SRS. The given reference signal may be at least one of a Synchronization Signal/Physical Broadcast Channel (SS/PBCH) block, a Channel State Information Reference Signal (CSI-RS), or and SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the given reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Further, the SRS index, the SRS resource ID, and the SRI may be replaced with each other.

The SRS spatial relation information may include a serving cell index, a bandwidth part (BWP) index (BWP ID), and the like corresponding to the given reference signal.

When spatial relation information regarding the SSB or CSI-RS and the SRS is configured for a given SRS resource, the UE may transmit the SRS resource by using the same spatial domain filter (spatial domain transmission filter) as a spatial domain filter (spatial domain reception filter) for receiving the SSB or CSI-RS. In this case, the UE may assume that the UE reception beam of the SSB or CSI-RS and the UE transmission beam of the SRS are the same.

For a given SRS (target SRS) resource, when spatial relation information regarding another SRS (reference SRS) and the SRS (target SRS) is configured, the UE may transmit the target SRS resource by using the same spatial domain filter (spatial domain transmission filter) as a spatial domain filter (spatial domain transmission filter) for transmitting the reference SRS. That is, in this case, the UE may assume that the UE transmission beam of the reference SRS and the UE transmission beam of the target SRS are the same.

The UE may determine the spatial relation of the PUSCH scheduled by the DCI based on a value of a given field (for example, SRS resource identifier (SRI) field) in the DCI (for example, DCI format 0_1). Specifically, the UE may use the spatial relation information (for example, "spatialRelationInfo" of the RRC information element) of the SRS resource determined based on the value (for example, SRI) of the given field for the PUSCH transmission.

When the codebook-based transmission is used for the PUSCH, in the UE, two SRS resources per SRS resource set may be configured by RRC, and one of the two SRS resources may be indicated by DCI (1-bit SRI field). When the non-codebook-based transmission is used for the PUSCH, in the UE, four SRS resources per SRS resource set may be configured by RRC, and one of the four SRS resources may be indicated by DCI (2-bit SRI field).

In NR of Rel. 16 or later, it is studied to explicitly perform notification of a common beam for both DL and UL. For example, a TCI state may be used as (or instead of) PUSCH spatial relation information. The TCI state may be at least one of a downlink TCI state (a DL TCI state), an uplink TCI state (a UL TCI state), and a unified TCI state.

Note that the UL TCI state may be replaced with spatial relation information (spatialrelationinfo). The unified TCI state may mean a TCI state used in common to both DL and UL.

In addition to an SSB index, a CSI-RS ID, and an SRS ID, a TCI state ID, a control resource set (CORESET) ID, or the like may be configured as an index of a reference RS of a spatial relation. UE in which a TCI state ID or a CORESET ID is configured as a spatial relation, when performing UL transmission on the basis of the spatial relation, may assume that the same spatial domain filter as that used for DL reception conforming to the TCI state ID or a TCI state ID corresponding to the CORESET ID is used for the UL transmission.

(Path-Loss RS)

The Path-loss $PL_{b,f,c}(q_d)$ [dB] in transmission power control of each of a physical uplink shared channel (PUSCH), a physical uplink control channel (PUCCH), and a measurement reference signal (sounding reference signal (SRS)) is calculated by the UE by using index $q_d$ of a reference signal (an RS, or a Path-loss reference RS (PathlossReferenceRS)) for a downlink BWP associated with active UL BWP b of carrier f of serving cell c.

In the present disclosure, a Path-loss reference RS, a Path-loss (PL)-RS, index $q_d$, an RS used for Path-loss calculation, and an RS resource used for Path-loss calculation may be replaced with each other. In the present disclosure, calculation, estimation, measurement, and tracking may be replaced with each other.

The PL-RS may be at least one of DL RSs such as an SSB and a CSI-RS.

For accurate Path-loss measurement for transmission power control, in the UE of Rel. 15, up to 4 PL-RSs are configured by RRC signaling. Even in a case where the UL Tx beam (spatial relation) is updated by an MAC CE, the PL-RS cannot be updated by an MAC CE.

In the UE of Rel. 16, up to 64 PL-RSs are configured by RRC signaling, and one PL-RS is indicated (activated) by an MAC CE. The UE is required to track up to 4 active PL-RSs for all UL channels (an SRS, a PUCCH, and a PUCCH). Tracking a PL-RS may be calculating a Path-loss based on measurement of the PL-RS and retaining (storing) the Path-loss.

In a case where a TCI state for a PDCCH or a PDSCH is updated by an MAC CE, also the PL-RS may be updated to the TCI state.

(Default Spatial Relation and Default PL-RS)

In Rel. 15 NR, individual MAC CEs of an MAC CE for activation/deactivation of a PUCCH spatial relation and an MAC CE for activation/deactivation of an SRS spatial relation are needed. The PUSCH spatial relation conforms to the SRS spatial relation.

In Rel. 16 NR, at least one of an MAC CE for activation/deactivation of a PUCCH spatial relation and an MAC CE for activation/deactivation of an SRS spatial relation may not be used.

A default spatial relation is studied as a spatial relation that the UE uses when a spatial relation cannot be used (for example, cannot be specified, is not designated, or is not activated) for UL transmission. Further, a default PL-RS is studied as a PL-RS used when a PL-RS cannot be used (the same as above) for UL transmission or when a default spatial relation is used.

For example, in a case where in FR2 neither a spatial relation nor a PL-RS for a PUCCH is configured or activated, default assumptions of the spatial relation and the PL-RS (a default spatial relation and a default PL-RS) are applied to the PUCCH. In a case where in FR2 neither a spatial relation nor a PL-RS for an SRS is configured or activated, default assumptions of the spatial relation and the PL-RS (a default spatial relation and a default PL-RS) are applied to the PUSCH scheduled by DCI format 0_1 and the SRS.

In a case where CORESETs are configured in an active DL BWP on a CC, the default spatial relation and the default PL-RS may conform to the TCI state or the QCL assumption of the CORESET having the smallest (lowest) CORESET ID in the active DL BWP. In a case where no CORESETs are configured in an active DL BWP on a CC, the default spatial relation and the default PL-RS may conform to the active TCI state having the smallest TCI state ID of PDSCHs in the active DL BWP.

In Rel. 15, the spatial relation of a PUSCH scheduled by DCI format 0_0 conforms to the spatial relation of the PUCCH resource having the smallest PUCCH resource ID among active spatial relations of PUCCHs on the same CC. Even in a case where no PUCCHs are transmitted on SCells, the network needs to update the PUCCH spatial relations on all SCells.

In Rel. 16, a PUCCH configuration for a PUSCH scheduled by DCI format 0_0 is not needed. A default spatial relation and a default PL-RS are applied to a PUSCH scheduled by DCI format 0_0.

(Multi-TRPs)

In NR, studies are underway to allow one or more transmission/reception points (TRPs) (multi-TRPs) to perform DL transmission to the UE by using one or more panels (multi-panel). It is also considered that UE performs UL transmission to one or a plurality of TRPs (see FIG. 1).

FIG. 1 illustrates an example in which a UE performs repeated UL transmission using four transmission occasions to four TRPs. The transmission occasion may be a unit of repetition transmission. A plurality of transmission occasions may be applied with at least one of time division multiplexing (TDM), frequency division multiplexing (FDM), or space division multiplexing (SDM).

The plurality of TRPs may correspond to the same cell identifier (ID), or may correspond to different cell IDs. The cell ID may be a physical cell ID or a virtual cell ID.

However, in the NR specifications so far, how to control repeated UL transmission of a UE when multi-panels/TRPs are used has not been sufficiently studied. For example, a default spatial relation, a default PL-RS, or the like that the UE applies to repetition transmission is not clear.

For ultra-reliable and low-latency communications (URLLC), it is studied not to explicitly indicate the UL beam. In this case, it is assumed that the UE performs UL transmission (UL repetition transmission) on the basis of a default spatial relation and a default PL-RS. In such a case, if a default spatial relation or the like is not appropriately determined, repetition transmission cannot be appropriately performed.

If repetition transmission for the multi-TRPs is not appropriately performed, a reduction in throughput or a degradation in communication quality may be caused.

Thus, the present inventors have conceived a method for appropriately determining a spatial relation/PL-RS for repetition transmission. According to an aspect of the present disclosure, for example, a UE may perform repetition transmission for multi-TRPs using different beams for each repetition unit (for example, slot, subslot).

Hereinafter, embodiments according to the present disclosure will be described in detail with reference to the drawings. The radio communication methods according to the embodiments may be applied alone or in combination.

Note that in the present disclosure, “A/B” may indicate “at least one of A and B”.

In the present disclosure, a panel, an uplink (UL) transmission entity, a TRP, spatial relation, a control resource set (CORESET), a PDSCH, a codeword, a base station, a given antenna port (e.g., demodulation reference signal (DMRS) port), a given antenna port group (e.g., DMRS port group), a given group (e.g., code division multiplexing (CDM) group, given reference signal group, and CORESET group), CORESET pool, and the like may be replaced with each other. Further, the TRP identifier (ID) and the TRP may be replaced with each other.

Further, the CORESET in the following embodiments may mean a CORESET associated with a BWP, or may mean a CORESET associated with (any BWP of) a cell.

In the present disclosure, the index, the ID, the indicator, the resource ID, and the like may be replaced with each other. In the present disclosure, a beam, a TCI, a TCI state, a DL TCI state, a UL TCI state, a unified TCI state, a QCL, a QCL assumption, a spatial relation, spatial relation information, an SRI, an SRS resource, a precoder, and the like may be replaced with each other. Further, TCI state ID #i (i being an integer) may be expressed as TCI #i.

In the present disclosure, a list, a group, a set, a subset, a cluster, and the like may be replaced with each other.

The PUCCH/PUSCH/SRS over a plurality of TRPs in the following embodiments may be replaced with repeated PUCCH/PUSCH/SRS over a plurality of TRPs, or simply repeated PUCCH/PUSCH/SRS, repetition transmission, or the like.

Hereinafter, in the present disclosure, a default spatial relation may be replaced with a default spatial relation for a PUSCH/PUCCH/SRS of repetition transmission, simply a default spatial relation for repetition transmission, or the like.

Further, the spatial relation (or default spatial relation) of the present disclosure may be replaced with a PL-RS (or a default PL-RS). That is, although the following embodiments mainly describe the determination of a spatial relation for repetition transmission, the present disclosure also supports the determination of a PL-RS for repetition transmission (for example, repetition transmission of a PUCCH/PUSCH/SRS).

(Radio Communication Method)

First Embodiment

Figure 2A:
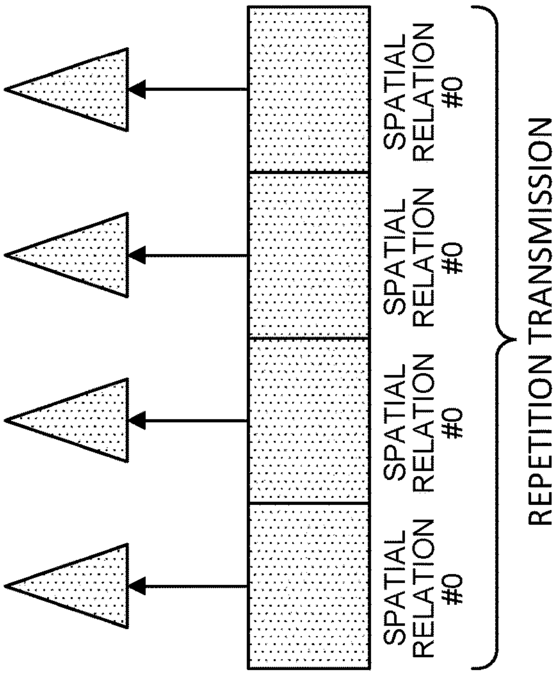
FIGS. 2A and 2B are diagrams illustrating an example of a default spatial relation of repetition transmission.
Figure 2B:
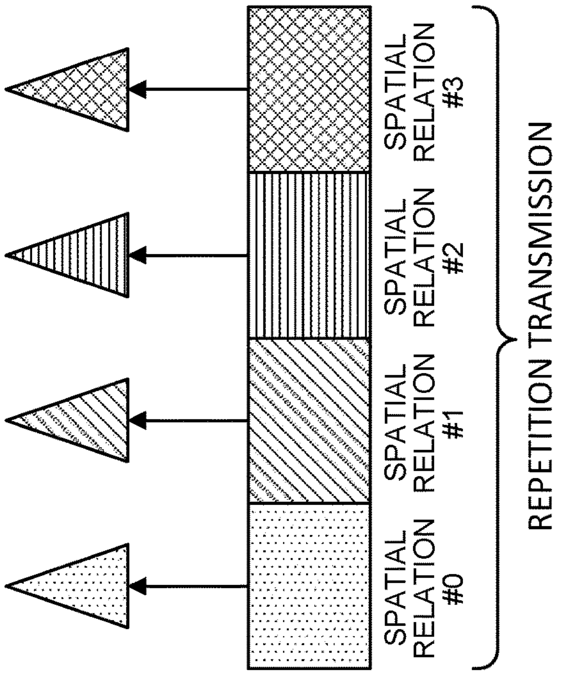

A first embodiment relates to a default spatial relation for transmission occasions of repetition transmission. FIGS. 2A and 2B are diagrams illustrating an example of a default spatial relation of repetition transmission. FIGS. 2A and 2B correspond to four times of repeated UL transmission. Note that in the following drawings, different types of hatching regarding TRPs, repetition transmission/reception, etc. may mean different spatial relations (beams).

The default spatial relation may be the same (or common) between transmission occasions (Embodiment 1.1). In this case, for example, the same QCL can be applied to DMRSs over a plurality of slots, and hence better channel estimation accuracy at the TRP can be secured. FIG. 2A shows an example in which a UE performs repetition transmission of transmission occasions in accordance with the same spatial relation #0.

The UE may assume that one identical default spatial relation is selected by any of the following:

- the same rules as in Rel. 16 (Embodiment 1.1.1),
- a TCI state/QCL of scheduling DCI (Embodiment 1.1.2), or
- a TCI state of a configured/activated PL-RS (Embodiment 1.1.3).

In Embodiment 1.1.1, the default spatial relation may be a spatial relation corresponding to the smallest CORESET ID or the smallest TCI state ID, as described above for Rel. 16 NR.

According to Embodiment 1.1.1, a default spatial relation can be determined in a similar manner to conventional rules, and hence UE implementation is easy.

In Embodiment 1.1.2, the default spatial relation may be a spatial relation corresponding to a TCI state of a CORESET where scheduling DCI is detected.

According to Embodiment 1.1.2, UL transmission can be performed on the basis of a successfully received beam, and hence success in UL transmission can be expected.

In Embodiment 1.1.3, the default spatial relation may be a spatial relation corresponding to a TCI state of a PL-RS configured by RRC or a PL-RS activated by a MAC CE.

According to Embodiment 1.1.3, UL transmission can be performed on the basis of a beam of a configured or activated PL-RS used for transmission power control of repetition transmission (in other words, presumed to be appropriate to represent the channel between the UE and the base station), and hence success in UL transmission can be expected.

The default spatial relation may be different between transmission occasions (Embodiment 1.2). In this case, for example, better robustness (space diversity) for blockage suppression can be secured by using multi-TRPs. FIG. 2B illustrates an example in which a UE performs repetition transmission of a first to a fourth transmission occasion in accordance with different spatial relations #0 to #3.

The UE may assume that a plurality of default spatial relations for a plurality of transmission occasions are derived by any of the following:

- a TCI state ID/QCL ID of each CORESET (Embodiment 1.2.1),
- the order of TCI state IDs/QCL IDs/spatial relation IDs indicated (which may be replaced with configured, activated, or the like) by RRC/MAC CE (Embodiment 1.2.2),
- a given TCI state/QCL for at least one transmission occasion and a configured/activated TCI state/QCL for the other transmission occasions (Embodiment 1.2.3),
- the order of beam IDs indicated by RRC/MAC CE (Embodiment 1.2.4), or
- the order of CORESETs given or indicated by RRC/MAC CE (Embodiment 1.2.5).

In Embodiment 1.2.1, the plurality of default spatial relations may include the TCI states corresponding to all configured CORESETs. For example, a UE configured with CORESET #0 to #2 may perform transmission in accordance with the TCI state of CORESET #0, the TCI state of CORESET #1, the TCI state of CORESET #2, and the TCI state of CORESET #0 in the first to fourth transmission occasions of FIG. 2B, respectively.

According to Embodiment 1.2.1, the UE can determine default spatial relations for multi-TRPs even without additional/specific signaling as compared to Rel. 16, and hence an increase in the amount of communication required for notification of default spatial relations can be suppressed.

In Embodiment 1.2.2, the plurality of default spatial relations may correspond to the order (ordering) of configured/activated given spatial relation IDs. The order may be specified by a list including a plurality of sets of an index that indicates what position in the order the spatial relation corresponds to the transmission occasion of (which may be referred to as an ordering index) and a TCI state ID corresponding to the index. Note that the index may be included in the list implicitly. Further, the index may start from 0.

Note that the order of spatial relation IDs may be referred to as a list/set/group/sequence of spatial relation IDs (or spatial relations), or the like.

FIG. 3 is a diagram illustrating an example of the order of spatial relation IDs according to Embodiment 1.2.2. In this example, TCI state IDs #0 to #3 are associated with indices 1 to 4, respectively. In this case, the UE may perform transmission in accordance with TCI state IDs #0 to #3 in the first to fourth transmission occasions of FIG. 2B, respectively.

According to Embodiment 1.2.2, the UE can easily determine default spatial relations for multi-TRPs.

In Embodiment 1.2.3, the UE may determine a default spatial relation of at least one transmission occasion among a plurality of default spatial relations on the basis of, for example, the determination of one default spatial relation shown in Embodiment 1.1 (Embodiments 1.1.1 to 1.1.3). Further, the UE may determine default spatial relations of the other transmission occasions on the basis of, for example, the determination of a plurality of default spatial relations shown in Embodiment 1.2.1 or 1.2.2.

Note that the at least one transmission occasion mentioned above in which the determination of a default spatial relation shown in Embodiment 1.1 is used may be the initial (that is, the first) transmission occasion of repetition, or may be another specific (for example, the last) transmission occasion.

Figure 4A:
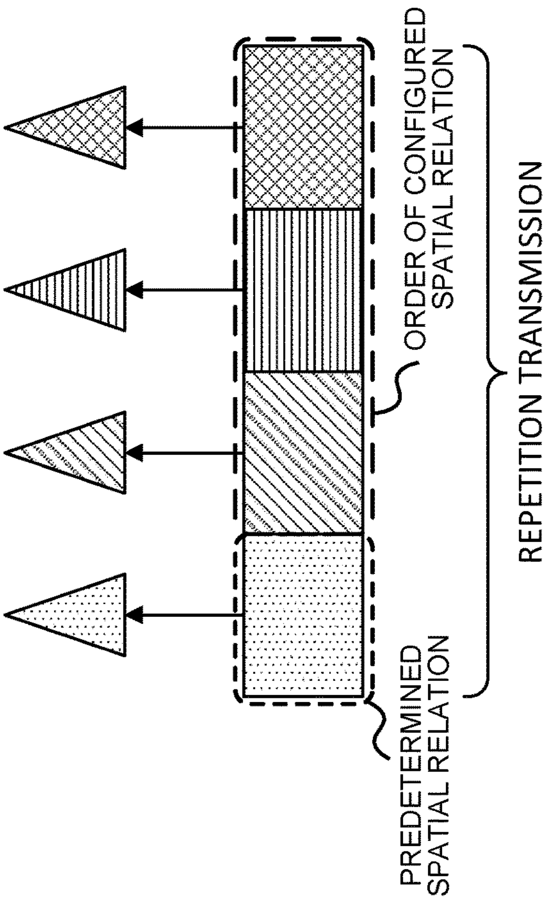
FIGS. 4A and 4B are diagrams illustrating examples of a default spatial relation according to Embodiment 1.2.3.
Figure 4B:
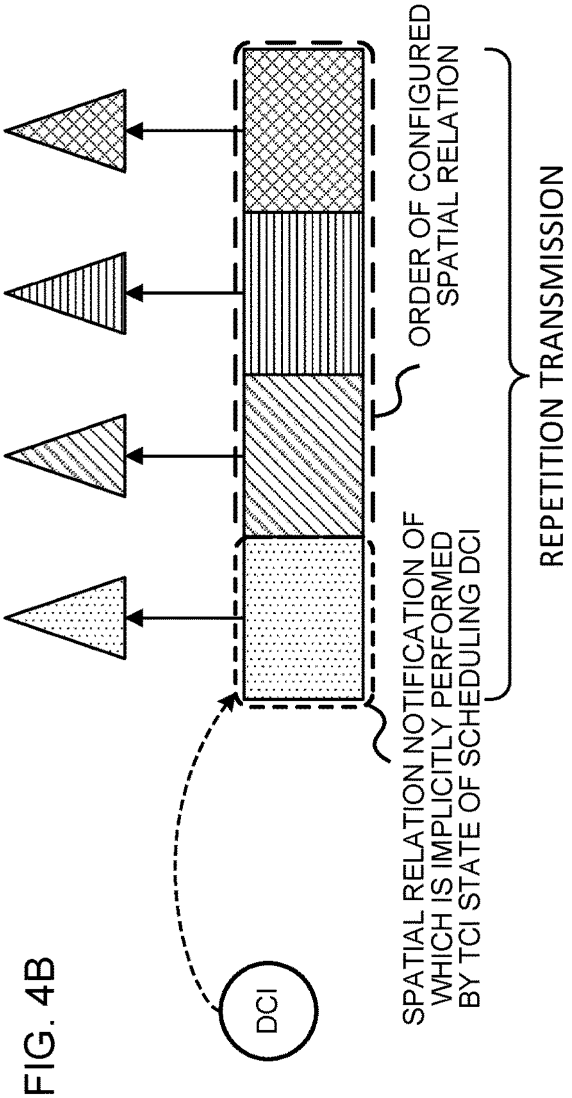

FIGS. 4A and 4B are diagrams illustrating examples of a default spatial relation according to Embodiment 1.2.3. In this example, it is assumed that the number of repetition transmissions is four.

FIG. 4A shows an example in which a default spatial relation of a first transmission occasion is determined on the basis of Embodiment 1.1.1 and default spatial relations of a second to a fourth transmission occasion are determined on the basis of Embodiment 1.2.2. The default spatial relation of the first transmission occasion is a given spatial relation (for example, the spatial relation of the smallest CORESET ID).

FIG. 4B shows an example in which a default spatial relation of a first transmission occasion is determined on the basis of Embodiment 1.1.2 and default spatial relations of a second to a fourth transmission occasion are determined on the basis of Embodiment 1.2.2. The default spatial relation of the first transmission occasion is a spatial relation notification of which is implicitly performed by a TCI state of scheduling DCI (for example, DCI format 0_0, 0_1, 0_2, or the like) of repetition transmission.

According to Embodiment 1.2.3, for example, the default spatial relation of the first slot of repetition transmission of multi-slots has common behavior to a default spatial relation of a single slot (which has no repetition), and complication of control of the UE can be suppressed.

In Embodiment 1.2.4, a plurality of default spatial relations may correspond to the order (ordering) of configured/activated given beam IDs. The order may be specified by a list including a plurality of sets of an index that indicates what position in the order the beam is of (which may be referred to as an ordering index) and a beam ID corresponding to the index. Note that the index may be included in the list implicitly. Further, the index may start from 0.

Note that the order of beam IDs may be referred to as a list/set/group/sequence, or the like of beam IDs (or beams).

The default spatial relation of the first transmission occasion of repetition transmission may be a beam ID corresponding to the start position (start index), or may be a beam ID corresponding to the start ID.

The default spatial relation of the i-th transmission occasion of repetition transmission may be a beam ID corresponding to an index of mod({the start index+i−2}, the number of repetition transmissions)+1, or may be a beam ID corresponding to an index of mod({(the index forming a set with the start ID)+i−2}, the number of repetition transmissions)+1. Note that mod(X, Y) means a remainder (a modulo operation) obtained by dividing X by Y.

In Embodiment 1.2.4 above, the UE may determine the start ID or the start position on the basis of, for example, at least one of the following:

- a TCI state of scheduling DCI,
- a default TCI state/default QCL assumption,
- an explicit indication by RRC/MAC/DCI (for example, a notification of information regarding the start ID),
- a TCI state of a configured/activated PL-RS, or
- the position of the start time of transmission (for example, the start slot, the start subslot, the start frame, the start subframe, or the start symbol).

Further, in Embodiment 1.2.4 above, the UE may assume that the start ID is a specific beam ID (for example, the smallest beam ID; in the case of FIG. 5A described later, beam ID #1) in a configured/activated/given order of beams.

Further, in Embodiment 1.2.4 above, the UE may assume that the start position (start index) is a specific index (for example, the smallest index; in the case of FIG. 5A described later, ordering index 1) regarding a configured/activated/given order of beams.

Figures 5A, 5B:
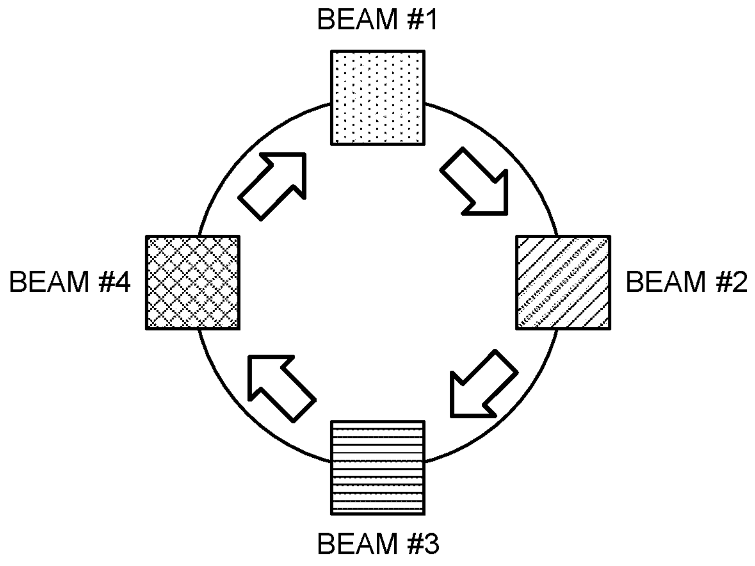
FIGS. 5A and 5B are diagrams illustrating an example of the order of beam IDs according to Embodiment 1.2.4.

FIGS. 5A and 5B are diagrams illustrating an example of the order of beam IDs according to Embodiment 1.2.4. As illustrated in FIG. 5A, in this example, beam ID #1 to #4 are associated with indices 1 to 4, respectively. Assuming that, for example, the UE has determined that the start ID is beam ID #1, the UE may perform transmission in accordance with beam ID #1 to #4 in the first to fourth transmission occasions of FIG. 2B, respectively.

FIG. 5B is a diagram illustrating transition of the turns of the beam IDs of FIG. 5A. That is, when the index of a transmission occasion is 4, the index of the next transmission occasion is 1.

According to Embodiment 1.2.4, the UE can easily determine default spatial relations for multi-TRPs. Further, the UE can flexibly control the use of the best beam for the first transmission occasion.

Embodiment 1.2.5 above may use subject matter in which the order of beams of Embodiment 1.2.4 above is replaced with the order of CORESETs (or CORESET IDs). For example, the start ID (start position) of CORESETs may be determined on the basis of a parameter similar to that described for the start ID of Embodiment 1.2.4 above.

Note that the network may configure, for each CORESET, one of the best three TCI states. In this case, assuming that the order of CORESETs includes three CORESETs, the UE can determine the spatial relation in accordance with the above best three TCI states.

Figure 6:
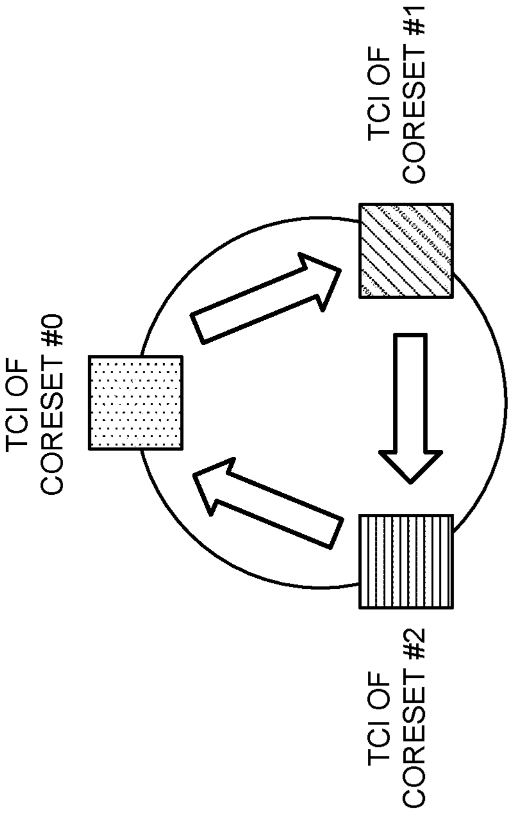
FIG. 6 is a diagram illustrating an example of the order of CORESETs according to Embodiment 1.2.5.

FIG. 6 is a diagram illustrating an example of the order of CORESETs according to Embodiment 1.2.5. In this example, it is assumed that the order of CORESETs is given to be CORESET #0, #1, and #2 in this order. When the default spatial relation of a transmission occasion follows the TCI of CORESET #2, the default spatial relation of the next transmission occasion may follow the TCI of CORESET #0.

According to Embodiment 1.2.5, the UE can easily determine default spatial relations for multi-TRPs. When the order of CORESETs is predefined, no additional signaling regarding the order of CORESETs is needed.

Modification Examples of Embodiment 1.2

In Embodiments 1.2.1 to 1.2.5 described above, when the number of derived default spatial relations is the same as the number of repetition transmissions (the number of UL transmission occasions), mapping may be performed on a one-to-one basis; otherwise, mapping may not be performed on a one-to-one basis.

When the number of derived default spatial relations (beams) is larger than the number of repetition transmissions (the number of UL transmission occasions), the first N (N is the number of times of repetition) IDs from the largest (or smallest) side among the IDs (CORESET IDs, TCI state IDs, spatial relation IDs, beam IDs, or the like) corresponding to the default spatial relations may be applied to the repetition transmission occasions. For example, in the case of Embodiment 1.2.1, assuming that the number of CORESETs (for example, three) is larger than the number of times of repetition (for example, two), the TCI states of two CORESET IDs (for example, CORESET #0 and #1) may be applied to the first and second transmission occasions.

Note that "from the largest (or smallest) side" herein may be replaced with, for example, "from the start index (or start ID)" or the like in Embodiments 1.2.4 and 1.2.5.

When the number of derived default spatial relations (beams) is smaller than the number of repetition transmissions (the number of UL transmission occasions), IDs (CORESET IDs, TCI state IDs, spatial relation IDs, beam IDs, or the like) corresponding to the default spatial relations may be applied to the repetition transmission occasions on the basis of at least one of a first method (for example, a cyclic method (cyclic manner)) and a second method (for example, a sequential method (sequential manner).

For example, in the case of Embodiment 1.2.1, assuming that the number of CORESETs (for example, two) is smaller than the number of times of repetition (for example, four), the TCI states of two CORESET IDs (for example, CORESET #0 and #1) may be applied to the first to fourth transmission occasions.

In the case of the cyclic method, for example, the TCI of CORESET #0, the TCI of CORESET #1, the TCI of CORESET #0, and the TCI of CORESET #1 may be used for the first, second, third, and fourth transmission occasions, respectively. In the case of the sequential method, for example, the TCI of CORESET #0, the TCI of CORESET #0, the TCI of CORESET #1, and the TCI of CORESET #1 may be used for the first, second, third, and fourth transmission occasions, respectively.

According to the first embodiment described above, the UE can appropriately determine a default spatial relation for repetition transmissions.

Second Embodiment

A second embodiment describes a case where whether to apply the first embodiment or another embodiment, or not is based on UE capability.

When at least one of the following UE capabilities is reported, at least one of the first embodiment and other embodiments may be applied:

- whether different TCIs/QCLs/spatial relations can be applied to transmission occasions or not,
- whether different TCI states can be applied to the default TCI states/QCLs/spatial relations/PL-RSs of transmission occasions or not,
- the number of supported TCI states/QCLs/spatial relations,
- the number of supported CORESETs, or
- the number of beam switches (the number of times of beam switching) during all transmission occasions for repetition of the same data.

Further, in a case where information regarding some kind of number is reported as UE capability, at least one of the first embodiment and other embodiments may be applied when the number is a given value or more (or less).

According to the second embodiment described above, determination regarding a spatial relation of repetition transmission can be appropriately controlled on the basis of UE capability.

Third Embodiment

A third embodiment relates to HARQ-ACK transmission using a PUCCH/PUSCH for repetition of a PDSCH over multi-TRPs. The UE may use the PUCCH/PUSCH to repeatedly transmit one or a plurality of HARQ-ACKs in a plurality of transmission occasions (for example, multi-slots or multi-minislots).

The spatial relation of each transmission occasion for a PUCCH/PUSCH may be derived in a similar manner to the first embodiment. In other words, the default spatial relation of the first embodiment may be replaced with the (default) spatial relation of each transmission occasion for the PUCCH/PUSCH.

The spatial relation of each transmission occasion for a PUCCH/PUSCH may be derived from a set of TCI states of the corresponding PDSCH reception. For example, the UE may determine the spatial relation of each transmission occasion for a PUCCH/PUSCH on the basis of any of the following:

- one TCI state of the corresponding PDSCH (which may be replaced with PDSCH multi-slots or PDSCH reception occasions; the same applies hereinafter),
- all the TCI states of the corresponding PDSCH, or
- a plurality of (for example, N) TCI states of the corresponding PDSCH.

Notification of which of these to employ as the basis for determination may be performed to the UE by higher layer signaling (for example, RRC or a MAC CE) or the like.

Note that also the spatial relation of each transmission occasion derived from the above set may be referred to as a default spatial relation.

FIGS. 7A, 7B, 8A, and 8B are diagrams illustrating examples of a spatial relation of each transmission occasion for a PUCCH/PUSCH that transmits a HARQ-ACK according to the third embodiment. In each example, the left side shows PDSCH repetition transmission (the number of times of repetition: four) from multi-TRPs, and the right side shows repetition transmission (the number of times of repetition: four) of a HARQ-ACK corresponding to the PDSCH. In each drawing, the dotted line indicates the same beam (spatial relation) for PUCCH/PUSCH transmission occasions as the beam (TCI state) for PDSCH reception occasions.

Note that although an example in which the beams of the PDSCH reception occasions are different from each other is illustrated, the present invention is not limited thereto.

Figure 7A:
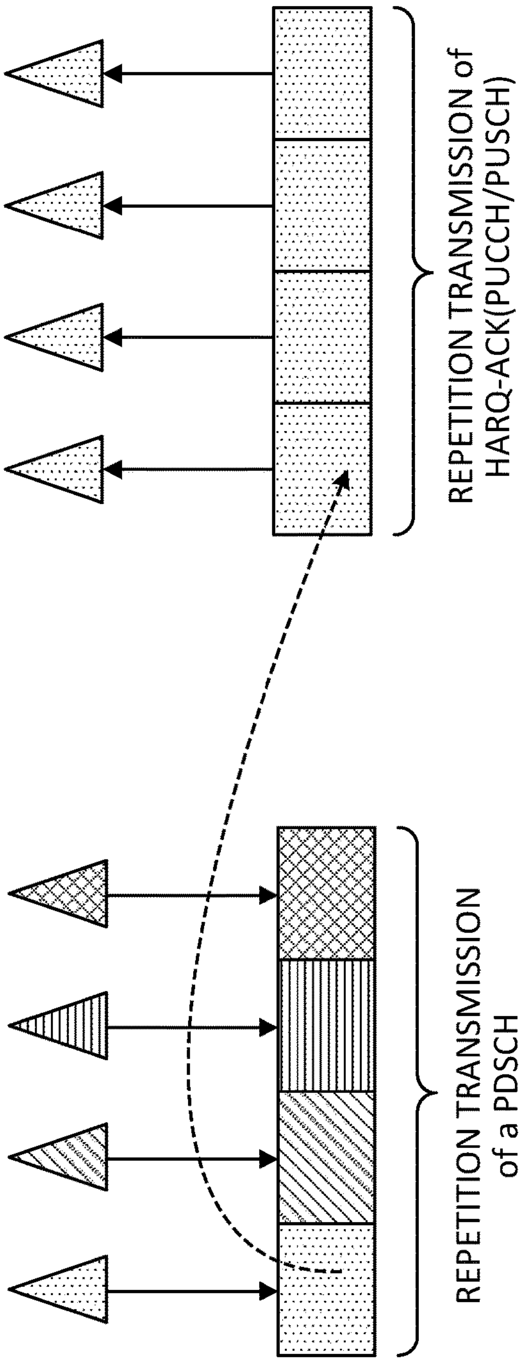
FIGS. 7A and 7B are diagrams illustrating examples of a spatial relation of each transmission occasion for a PUCCH/PUSCH that transmits a HARQ-ACK according to a third embodiment.

In FIG. 7A, all the spatial relations of the first to fourth transmission occasions for the PUCCH/PUSCH are determined on the basis of the TCI state of the first reception occasion for the PDSCH. Note that which reception occasion (which may be replaced with a reference destination slot number, a repetition slot index, or the like) of the PDSCH to employ as the basis for the determination of the spatial relation of each PUCCH/PUSCH transmission occasion may be given by a standard, or may be configured by higher layer signaling.

Figure 7B:
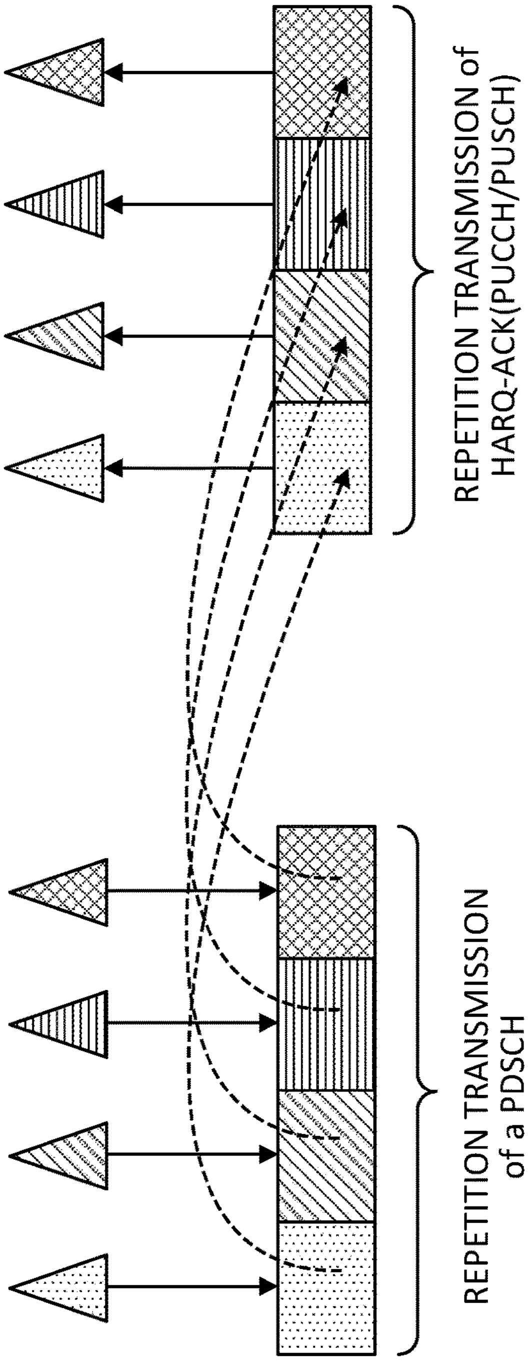

In FIG. 7B, the spatial relations of the first to fourth transmission occasions for the PUCCH/PUSCH are determined on the basis of the TCI states of the first to fourth reception occasions for the PDSCH, respectively. Note that the mapping of the PUCCH/PUSCH transmission occasions and the PDSCH reception occasions may not be in the same order as illustrated in FIG. 7B. The mapping may be given by a standard, or may be configured by higher layer signaling (for example, RRC, a MAC CE, or the like).

Figure 8A:
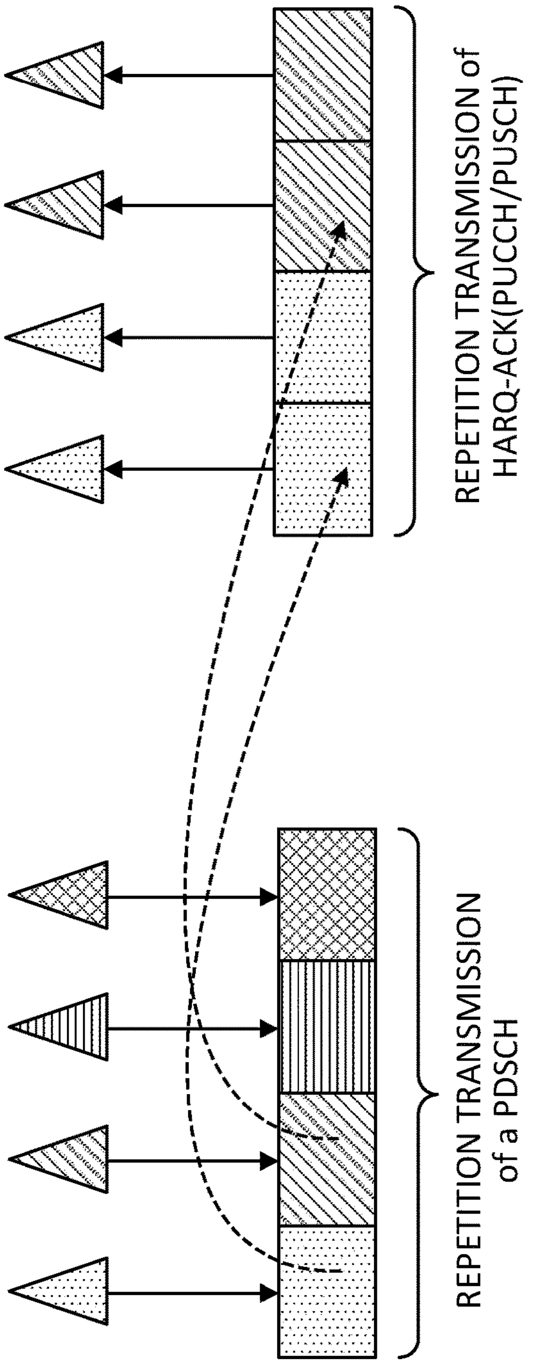
FIGS. 8A and 8B are diagrams illustrating examples of a spatial relation of each transmission occasion for a PUCCH/PUSCH that transmits a HARQ-ACK according to the third embodiment.
Figure 8B:
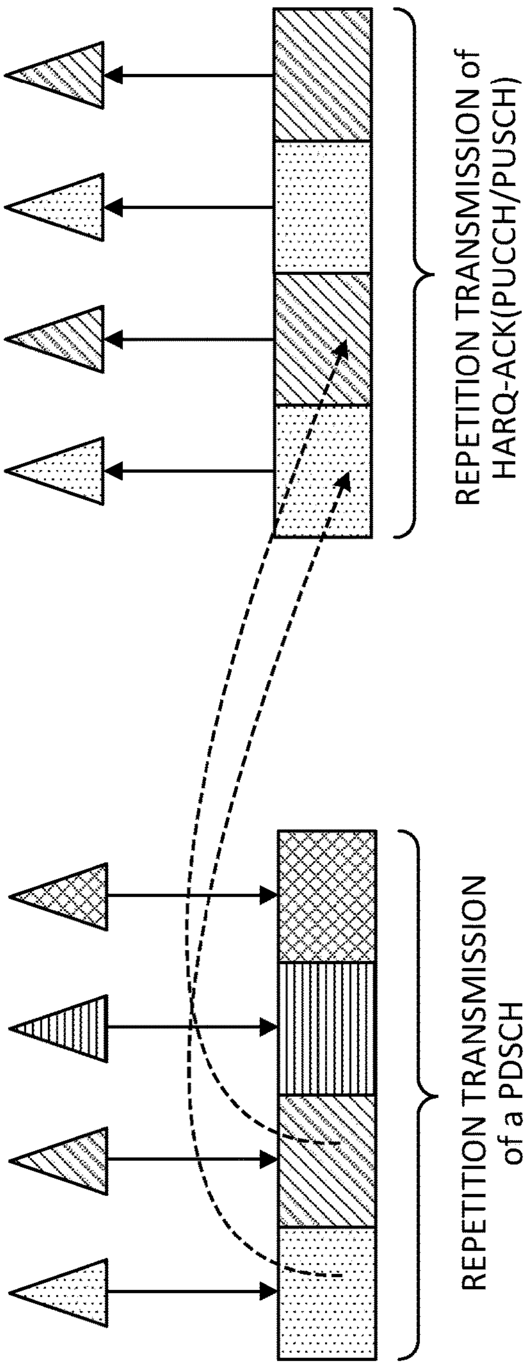

FIGS. 8A and 8B illustrate examples in which the spatial relation of each PUCCH/PUSCH transmission occasion is determined on the basis of N (=2) TCI states of the corresponding PDSCH.

In FIG. 8A, the spatial relations of the first to fourth transmission occasions for the PUCCH/PUSCH are determined on the basis of the TCI states of the first, first, second, and second reception occasions for the PDSCH, respectively (the sequential mapping method described above). In FIG. 8B, the spatial relations of the first to fourth transmission occasions for the PUCCH/PUSCH are determined on the basis of the TCI states of the first, second, first, and second reception occasions for the PDSCH, respectively (the cyclic mapping method described above).

The UE may determine (select) the N TCI states mentioned above from the TCI states of the reception occasions (slots, subslots, or the like) of repeated PDSCH on the basis of at least one of the following:

- the TCI states corresponding to N reception occasions from the first or from the last,
- N TCI state IDs from the largest (or smallest) TCI state ID among configured/activated TCI states,
- N TCI state IDs from the largest (or smallest) TCI state ID among the TCI states corresponding to the reception occasions,
- the TCI states corresponding to N CORESETs from the largest (or smallest) CORESET ID among the CORESETs corresponding to the reception occasions, or
- the TCI states corresponding to N TRPs (or CORESET pools) from the largest (or smallest) TRP index (or CORESET pool index) among the TRPs (or CORESET pools) corresponding to the reception occasions.

In the examples of FIGS. 8A and 8B, the UE uses, for repetition transmission, the TCI states corresponding to the first two reception occasions of repeated PDSCH.

The N TCI states applied to repetition transmission may correspond to the best N beams measured by the UE. For example, the UE may measure reference signals transmitted by using a large number of beams, and report, to the network, a beam report about a beam of which the result of measurement of L1-SINR/L1-RSRP or the like is higher. The base station may, on the basis of this report, instruct the UE to include the best N TCI states as TCI states for reception of a PDSCH scheduled on the UE.

When the UE uses, for repetition transmission, the top N beams of the measurement result, an improvement in communication characteristics is expected as compared to when the UE uses, for repetition transmission, a larger number of beams than the top N beams of the measurement result.

Note that if the best one beam at the timing of repetition transmission is found, it is desirable to perform repetition transmission by using only this beam from the viewpoint of communication characteristics. However, since in practice there are blockages including random elements, environmental variations, etc., it is difficult to find the best beam at the moment of communication. Hence, when diversity transmission/reception is performed by using the best N beams, an improvement in communication reliability can be expected. However, from the viewpoint of diversity, it is assumed that only two or four is sufficient as N (this is because it is unlikely that both two or all four beams will suffer from blockages at the same time). The N mentioned above may be given by the specifications, or may be configured on the UE by higher layer signaling.

According to the third embodiment described above, the UE can appropriately determine a spatial relation used for repetition transmission of a HARQ-ACK according to repetition reception of a PDSCH.

<Others>

Each of the above embodiments may be used independently for each channel/signal, or may be used in common to a plurality of channels/signals. For example, the default spatial relations of a PUCCH/PUSCH/SRS may be determined by different methods, or may be determined by a common method.

For example, higher layer signaling (for example, RRC signaling for a configuration of the order of beams) used in the present disclosure may be independently configured for each channel/signal, or may be collectively configured for a plurality of channels/signals by means of one parameter (in this case, the one parameter is applied to the plurality of channels/signals).

For example, higher layer signaling for a PUSCH (the order of beams for a PUSCH, or the like) may be configured by using at least one of the following:

- a parameter included in PUSCH configuration information (a PUSCH-Config information element),
- a parameter regarding transmission power control (Transmit Power Control (TPC)) for a PUSCH (for example, a parameter included in a PUSCH-PowerControl information element),
- a parameter regarding a beam for a PUSCH,
- a parameter regarding a notification of a PUSCH resource (a PUSCH resource and time domain resource allocation list (a PUSCH-TimeDomainResourceAllocation-List information element), part of a field that performs notification of the number of PUSCH repetitions indicated by a higher layer parameter or DCI (which may be referred to as, for example, a PUSCH repetition number field or the like), or part of a frequency domain resource allocation field indicated by a higher layer parameter or DCI), or
- a parameter regarding a notification of a PUCCH resource (a PUCCH resource (a PUCCH-Resource information element), a PUCCH resource set (a PUCCH-Resource-Set information element), part of a field that performs notification of the number of PUCCH repetitions indicated by a higher layer parameter or DCI (which may be referred to as, for example, a PUCCH repetition number field or the like), part of a PUCCH resource indicator field included in DCI, or part of a PUCCH resource indicated by a PUCCH resource indicator field included in DCI).

For example, higher layer signaling for a PUCCH (the order of beams for a PUCCH, or the like) may be configured by using at least one of the following:

- a parameter included in PUCCH configuration information (a PUSCH-Config information element),
- a parameter regarding transmission power control for a PUCCH (for example, a parameter included in a PUCCH-PowerControl information element),
- a parameter regarding a beam for a PUCCH,
- the parameter regarding a notification of a PUCCH resource described above, or
- the parameter regarding a notification of a PUSCH resource described above.

Further, higher layer signaling for a plurality of channels/signals may be configured for each UL BWP (for example, to be included in a BWP-Uplink information element), or may be configured for each cell (for example, to be included in a ServingCellConfig information element).

Note that the DCI (or the field of the DCI) in the present disclosure may be read as an implicit notification using the DCI. The implicit notification using the DCI may include at least one of a time resource, a frequency resource, a control channel element (CCE) index, a physical resource block (PRB) index, a resource element (RE) index, a search space index, a control resource set (CORESET) index, and an aggregation level of (detected) DCI (or corresponding to or used for receiving the DCI).

Further, each of the above embodiments may be applied to a case where (the operation of) multi-TRPs or multiple panels are configured in the UE, or may be applied to other cases. Further, each of the above embodiments may be applied to a case where the UE performs an operation based on URLLC (or has capability for URLLC), or may be applied to other cases.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 9:
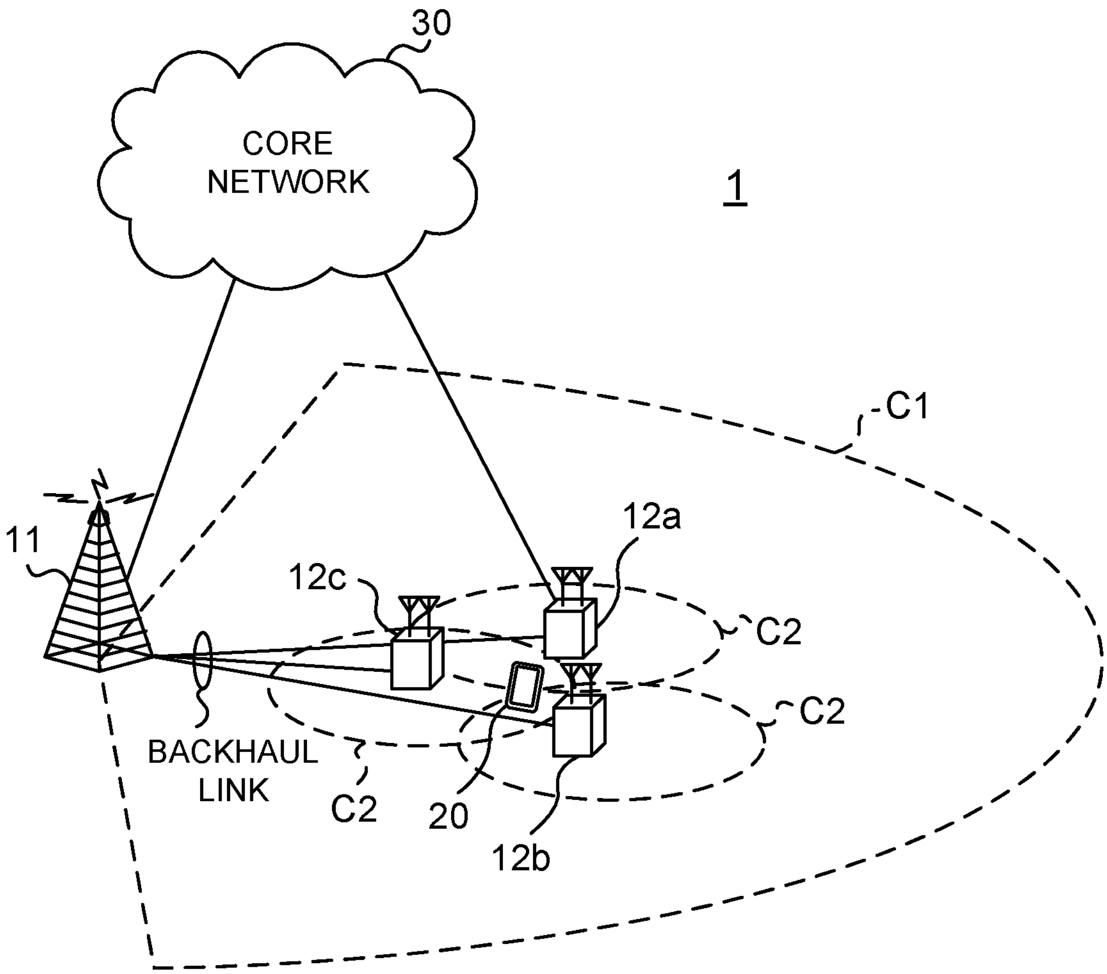
FIG. 9 is a diagram illustrating an example of a schematic configuration of a radio communication system according to an embodiment.

FIG. 9 is a diagram illustrating an example of a schematic configuration of the radio communication system according to the embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in the FR1, and the small cell C2 may be included in the FR2. For example, the FR1 may be a frequency band of 6 GHz or less (sub-6 GHz), and the FR2 may be a frequency band higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. User data, higher layer control information, and the like may be transmitted on the PUSCH. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or more search spaces. The UE may monitor the CORESET associated with a given search space on the basis of search space configuration.

One search space may correspond to a PDCCH candidate corresponding to one or a plurality of aggregation levels. One or more search spaces may be referred to as a search space set. Note that “search space”, “search space set”, “search space configuration”, “search space set configuration”, “CORESET”, “CORESET configuration”, and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), and scheduling request (SR) may be transmitted by the PUCCH. By means of the PRACH, a random access preamble for establishing a connection with a cell may be transmitted.

Note that in the present disclosure, downlink, uplink, and the like may be expressed without “link”. Further, various channels may be expressed without adding “physical” at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)."

(Base Station)

Figure 10:
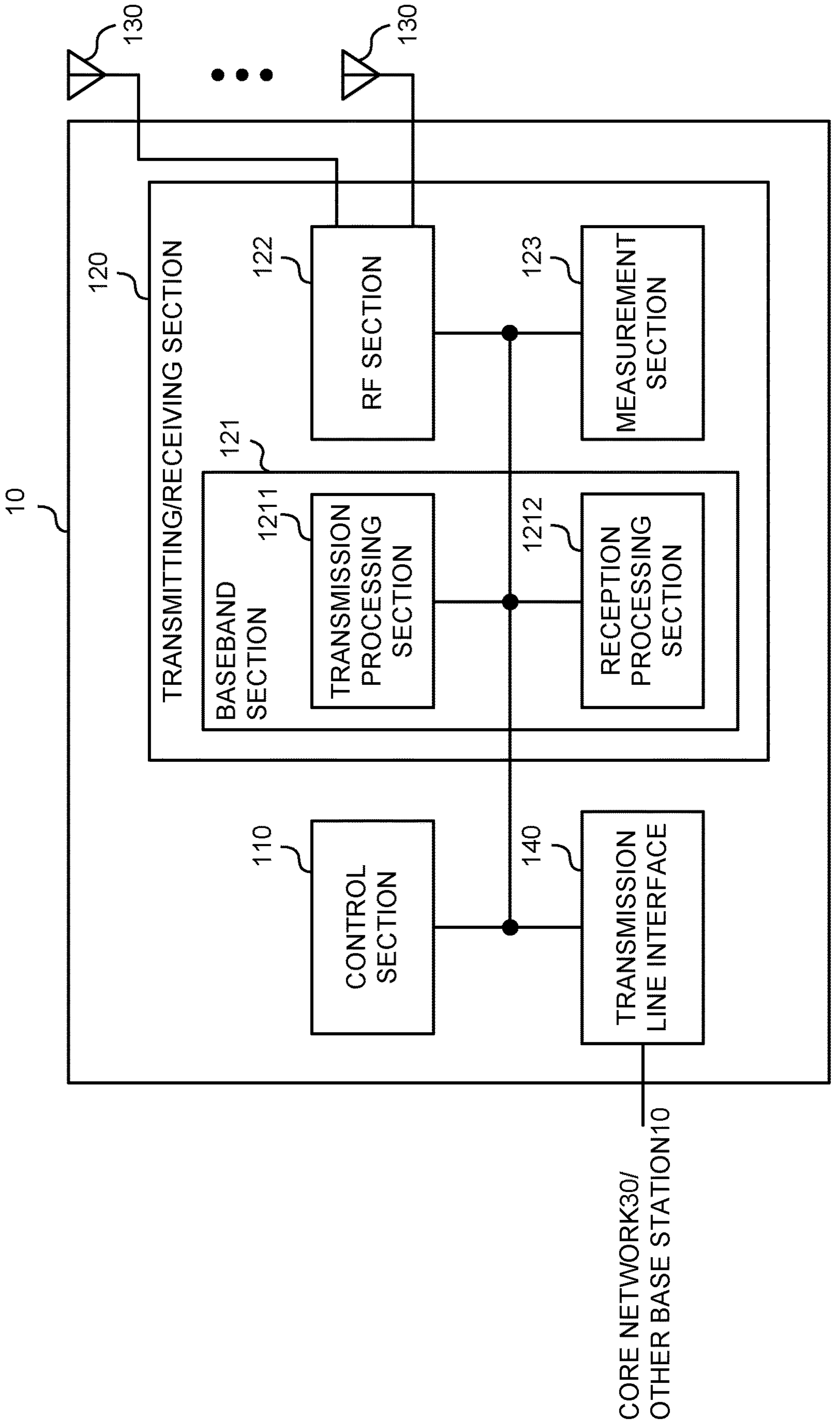
FIG. 10 is a diagram illustrating an example of a configuration of a base station according to an embodiment.

FIG. 10 is a diagram illustrating an example of a configuration of a base station according to the embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described on the basis of common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or release) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmitting/receiving circuit, and the like, which are described on the basis of common recognition in the technical field to which the present disclosure relates.

The transmitting/receiving section 120 may be constituted as an integrated transmitting/receiving section, or may be constituted by a transmitting section and a receiving section. The transmitting section may include the transmission processing section 1211 and the RF section 122. The receiving section may be constituted by the reception processing section 1212, the RF section 122, and the measurement section 123.

The transmission/reception antenna 130 can be constituted by an antenna described on the basis of common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 may transmit, to the user terminal 20, information for determining one or more default spatial relations to be applied to transmission occasions of uplink repetition transmission (for example, radio resource control (RRC) signaling, medium access control (MAC) signaling, and downlink control information (DCI)).

The transmitting/receiving section 120 may receive the repetition transmission (from the user terminal 20) using a spatial domain transmission filter based on the one or more default spatial relations.

(User Terminal)

Figure 11:
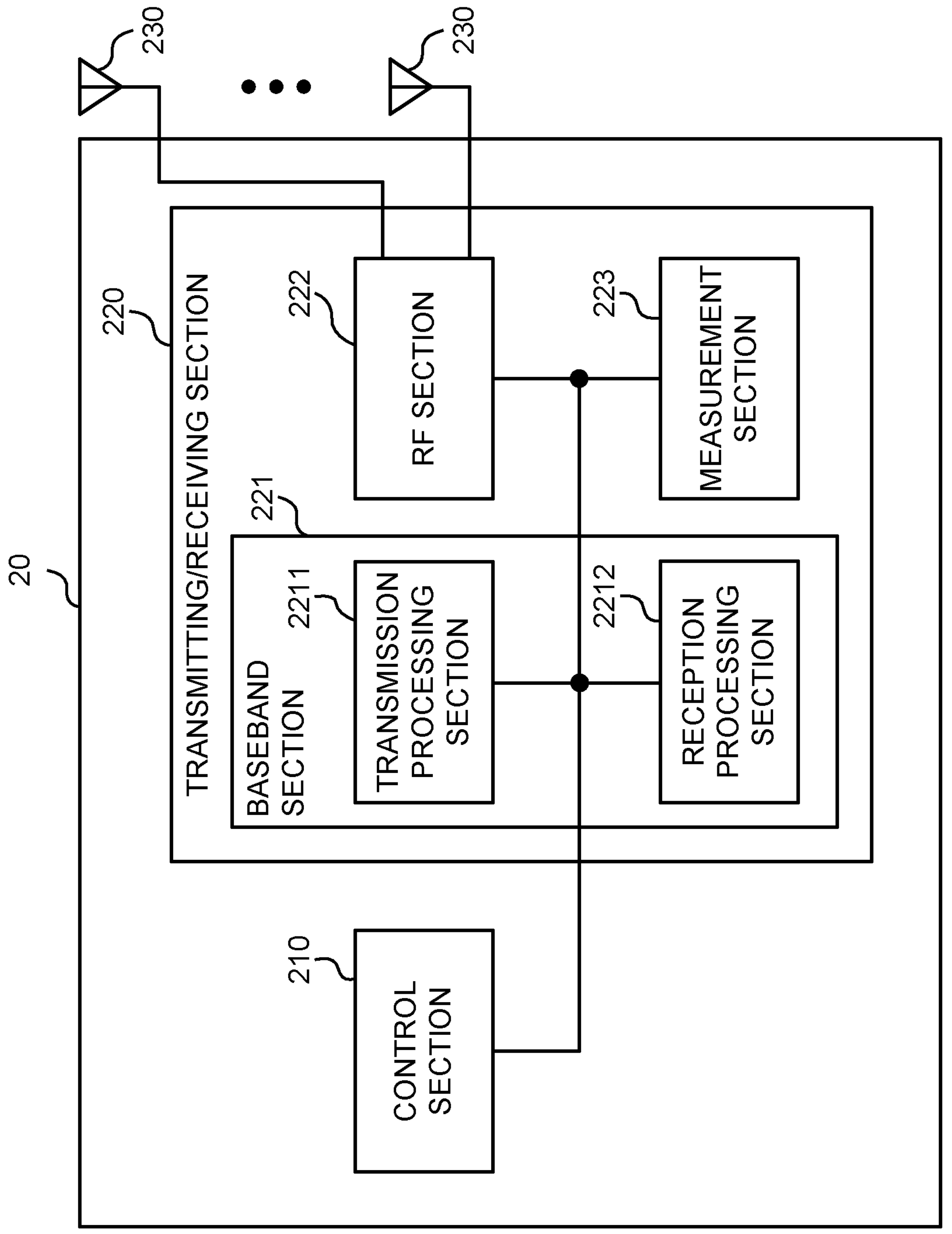
FIG. 11 is a diagram illustrating an example of a configuration of a user terminal according to an embodiment.

FIG. 11 is a diagram illustrating an example of a configuration of user terminal according to the embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like, which are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, and the like, which are described on the basis of common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined on the basis of configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

Note that the control section 210 may determine at least one of one or more default spatial relations and one or more default PL-RSs to be applied to transmission occasions of uplink repetition transmission. Note that the repetition transmission may be repetition transmission of at least one of a physical uplink shared channel (PUSCH), a physical uplink control channel (PUCCH), and a measurement reference signal (sounding reference signal (SRS)).

The transmitting/receiving section 220 may perform the repetition transmission by using a spatial domain transmission filter based on the one or more default spatial relations. The transmitting/receiving section 220 may perform the repetition transmission by using transmission power control based on the one or more default PL-RSs. When different default PL-RSs are used for transmission occasions, the transmission powers of the transmission occasions may be different.

The control section 210 may make determination such that the one or more default spatial relations include a transmission configuration indication (TCI) state corresponding to all configured control resource sets (control resource sets (CORESETs)).

The control section 210 may make determination such that the one or more default spatial relations correspond to the order of configured or activated spatial relation IDs.

When the repetition transmission is repetition transmission of a hybrid automatic repeat request acknowledgement (HARQ-ACK) for repetition reception of a physical downlink shared channel, the control section 210 may derive the one or more default spatial relations from a set of transmission configuration indication (TCI) states of the repetition reception.

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be achieved by combining the one device or the plurality of devices with software.

Here, the function includes, but is not limited to, determining, determining, judging, calculating, computing, processing, deriving, investigating, searching, asgivening, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 12:
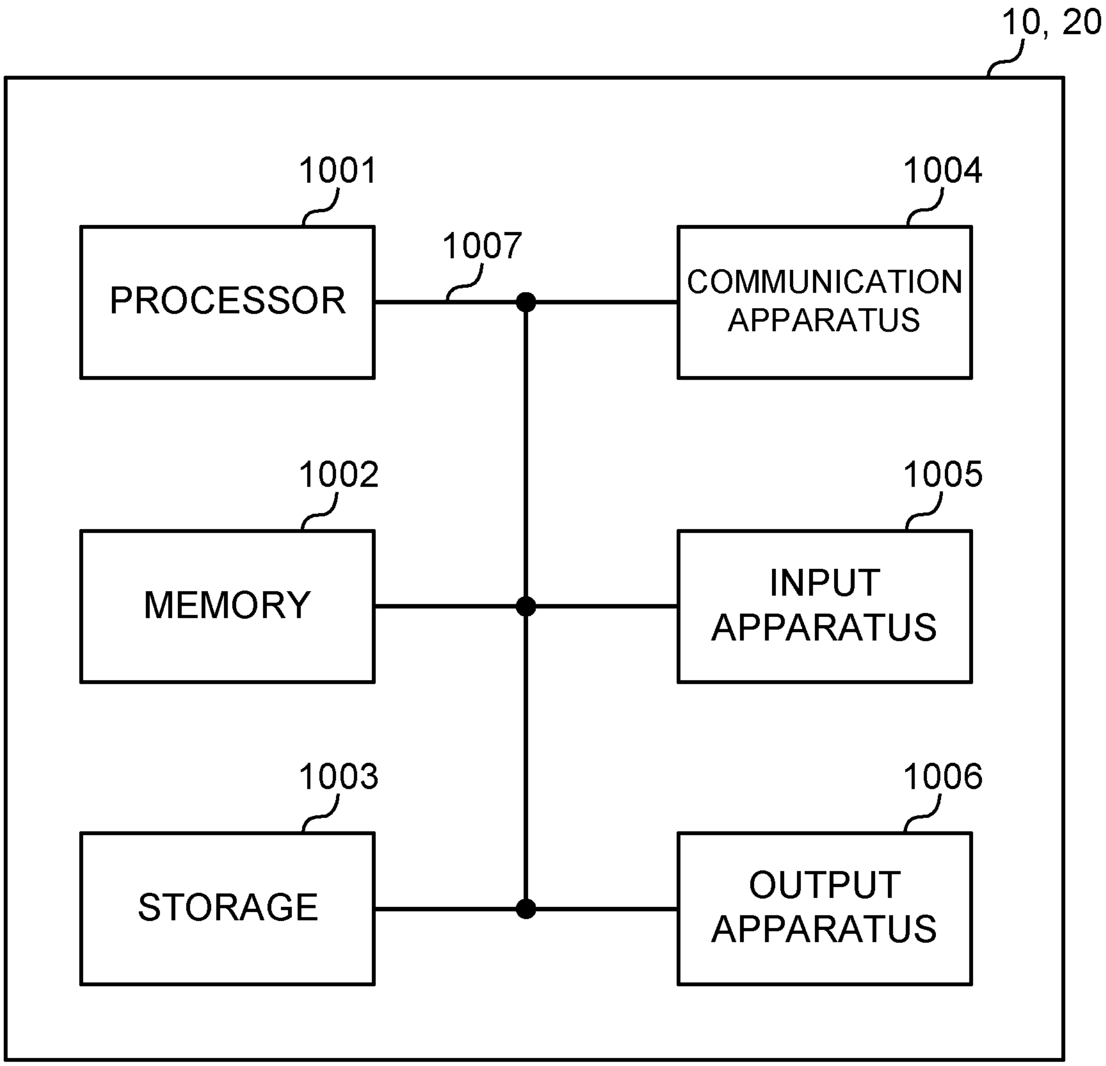
FIG. 12 is a diagram illustrating an example of a hardware configuration of the base station and the user terminal according to an embodiment.

For example, the base station, the user terminal, or the like according to one embodiment of the present disclosure may function as a computer that executes the processing of the radio communication method in the present disclosure. FIG. 12 is a diagram illustrating an example of a hardware configuration of the base station and the user terminal according to the embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Further, the processing may be executed by one processor, or the processing may be executed by two or more processors simultaneously or sequentially, or using other methods. Note that the processor 1001 may be implemented with one or more chips.

Each of functions of the base station 10 and the user terminal 20 is, for example, implemented by causing given software (program) to be read on hardware such as the processor 1001 or the memory 1002 to thereby cause the processor 1001 to perform operation, control communication via the communication apparatus 1004, and control at least one of reading and writing of data from or in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program code), software modules, data, and so on from at least one of the storage 1003 and the communication apparatus 1004 into the memory 1002, and executes various types of processing according to these. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), and other appropriate storage media. The memory 1002 may be referred to as a register, a cache, a main memory (primary storage apparatus), and the like. The memory 1002 may store a program (program code), a software module, and the like executable for implementing the radio communication method according to an embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmitting/receiving device) for performing inter-computer communication via at least one of a wired network and a wireless network, and for example, is referred to as network device, network controller, network card, communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be formed with one or more durations (frames) in the time domain. Each of the one or more periods (frames) included in the radio frame may be referred to as a subframe. Further, the subframe may include one or more slots in the time domain. A subframe may be a fixed time duration (for example, 1 ms) that is not dependent on numerology.

Here, the numerology may be a communication parameter used for at least one of transmission and reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or more symbols in the time domain. Further, the mini slot may be referred to as a sub slot. Each mini slot may include fewer symbols than the slot. A PDSCH (or PUSCH) transmitted in a time unit larger than the mini slot may be referred to as PDSCH (PUSCH) mapping type A. A PDSCH (or PUSCH) transmitted using the mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (frequency bandwidth, transmission power, and the like that can be used in each user terminal) to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one minislot, one subframe or one TTI in length. One TTI, one subframe, and the like may be each formed with one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given channel/signal outside the active BWP. Note that, a "cell", a "carrier", and the like in the present disclosure may be replaced with a BWP.

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be specified by a given index.

The names used for parameters and so on in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented using any of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only using the aspects/embodiments described in the present disclosure but also using another method. For example, the notification of information in the present disclosure may be performed using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of a base station and a base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be referred to as a transmitting apparatus, a receiving apparatus, a radio communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be replaced with a side channel.

Likewise, the user terminal in the present disclosure may be replaced with a base station. In this case, the base station 10 may be configured to have the functions of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used alone, used in a combination, and switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, but are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The term "on the basis of" used in the present disclosure does not mean "only on the basis of" unless otherwise specified. In other words, the phrase "based on" means both "based only on" and "based at least on."

Reference to elements with designations such as "first", "second", and so on as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The terms "judging (determining)" as used in the present disclosure may encompass a wide variety of operations. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, to "judge (determine)" may be replaced with "assuming", "expecting", "considering", and so on.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency domain, microwave, and optical (both visible and invisible) domains.

In the present disclosure, the phrase "A and B are different" may mean "A and B are different from each other." Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:

a processor that, when spatial relation information is not activated, determines to use different unified Transmission Configuration Indication (TCI) states for transmission occasions included in repetition transmission of a physical uplink control channel (PUCCH); and a transmitter that performs the repetition transmission of the PUCCH by using the different unified TCI states when a capability that indicates a number of the unified TCI states that are supported for the transmission occasions included in the repetition transmission of the PUCCH is transmitted, wherein the unified TCI states used for the repetition transmission of the PUCCH are included in a plurality of unified TCI states activated by a medium access control control element (MAC CE), and wherein the unified TCI states are TCI states used in common to both downlink and uplink.

2. A radio communication method for a terminal, comprising:

when spatial relation information is not activated, determining to use different unified Transmission Configuration Indication (TCI) states for transmission occasions included in repetition transmission of a physical uplink control channel (PUCCH); and performing the repetition transmission of the PUCCH by using the different unified TCI states when a capability that indicates a number of the unified TCI states that are supported for the transmission occasions included in the repetition transmission of the PUCCH is transmitted, wherein the unified TCI states used for the repetition transmission of the PUCCH are included in a plurality of unified TCI states activated by a medium access control control element (MAC CE), and wherein the unified TCI states are TCI states used in common to both downlink and uplink.

3. A base station comprising:

a transmitter that, when spatial relation information is not activated, transmits, to a terminal, information for determining to use different unified Transmission Configuration Indication (TCI) states for transmission occasions included in repetition transmission of a physical uplink control channel (PUCCH); and a receiver that receives the repetition transmission of the PUCCH by using the different unified TCI states when a capability that indicates a number of the unified TCI states that are supported for the transmission occasions included in the repetition transmission of the PUCCH is received, wherein the unified TCI states used for the repetition transmission of the PUCCH are included in a plurality of unified TCI states activated by a medium access control control element (MAC CE), and wherein the unified TCI states are TCI states used in common to both downlink and uplink.

4. A system comprising a terminal and a base station, wherein the terminal comprises:

a processor that, when spatial relation information is not activated, determines to use different unified Transmission Configuration Indication (TCI) states for transmission occasions included in repetition transmission of a physical uplink control channel (PUCCH); and a transmitter that performs the repetition transmission of the PUCCH by using the different unified TCI states when a capability that indicates a number of the unified TCI states that are supported for the transmission occasions included in the repetition transmission of the PUCCH is transmitted, wherein the unified TCI states used for the repetition transmission of the PUCCH are included in a plurality of unified TCI states activated by a medium access control control element (MAC CE), and wherein the unified TCI states are TCI states used in common to both downlink and uplink, and the base station comprises:

a transmitter that transmits information for determining the unified TCI states to the terminal; and a receiver that receives the repetition transmission of the PUCCH by using the different unified TCI states.

* * * * *